(12) United States Patent
Sano et al.

(10) Patent No.: US 8,040,327 B2
(45) Date of Patent: Oct. 18, 2011

(54) TOUCH PANEL DEVICE AND METHOD FOR MANUFACTURING TOUCH PANEL DEVICES

(75) Inventors: Satoshi Sano, Kawasaki (JP); Takashi Katsuki, Kawaski (JP); Yuji Takahashi, Kawasaki (JP); Fumihiko Nakazawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 723 days.

(21) Appl. No.: 12/222,405

(22) Filed: Aug. 8, 2008

(65) Prior Publication Data

US 2008/0316187 A1   Dec. 25, 2008

Related U.S. Application Data

(62) Division of application No. 11/017,860, filed on Dec. 22, 2004, now Pat. No. 7,423,636.

(30) Foreign Application Priority Data

Aug. 20, 2004   (JP) .................. 2004-241065

(51) Int. Cl.
*G06F 3/041*   (2006.01)
*G09G 5/00*   (2006.01)

(52) U.S. Cl. ........................ 345/173; 345/177
(58) Field of Classification Search .......... 345/172, 345/173, 174, 175, 176, 177; 310/313 A, 310/313 R; 178/18.01, 18.04
See application file for complete search history.

(56) References Cited

U.S. PATENT DOCUMENTS

| | | | |
|---|---|---|---|
| 4,752,709 A * | 6/1988 | Fujishima et al. | 310/313 A |
| 6,426,583 B1 * | 7/2002 | Onishi et al. | 310/313 R |
| 6,441,809 B2 * | 8/2002 | Kent et al. | 345/177 |
| 6,529,122 B1 | 3/2003 | Magnussen et al. | |
| 6,756,973 B2 * | 6/2004 | Sano et al. | 345/177 |
| 7,184,029 B2 | 2/2007 | Katsuki et al. | |
| 7,230,316 B2 | 6/2007 | Yamazaki et al. | |
| 2002/0171635 A1 * | 11/2002 | Takahashi et al. | 345/177 |
| 2003/0011577 A1 * | 1/2003 | Katsuki et al. | 345/173 |
| 2003/0076308 A1 * | 4/2003 | Sano et al. | 345/177 |
| 2003/0146673 A1 * | 8/2003 | Toda et al. | 310/313 D |
| 2004/0027342 A1 * | 2/2004 | Katsuki et al. | 345/177 |
| 2004/0104827 A1 | 6/2004 | Katsuki et al. | |
| 2005/0073505 A1 * | 4/2005 | Katsuki et al. | 345/173 |

FOREIGN PATENT DOCUMENTS

JP   2004-171213 A   6/2004

* cited by examiner

*Primary Examiner* — Amare Mengistu
*Assistant Examiner* — Stacy Khoo
(74) *Attorney, Agent, or Firm* — Westerman, Hattori, Daniels & Adrian, LLP

(57) ABSTRACT

Each of transducers of a touch panel device includes a piezoelectric thin film, a plate electrode disposed at one surface of the piezoelectric thin film and a comb-like electrode disposed at the other surface of the piezoelectric thin film. The comb-like electrode has a plurality of comb-like electrode fingers and a linear bus electrode to which one end of each of the plural comb-like electrode fingers is connected. A plurality of wiring electrodes is provided at the outer side of any of the transducers in parallel with the bus electrode of the transducer and is connected to the bus electrode and the plate electrode of any of the transducers. Each of the wiring electrodes includes an electrode base portion formed by printing silver paste containing fine particles on the substrate and an electrode main body formed by printing silver paste containing large particles and fine particles in a mixed manner on the electrode base portion.

4 Claims, 11 Drawing Sheets

TOUCH PANEL DEVICE AND METHOD FOR MANUFACTURING TOUCH PANEL DEVICES

This application is a divisional of application Ser. No. 11/017,860 filed Dec. 22, 2004, the entire contents of which are incorporated herein by reference, which is based upon and claims the benefit of priority from the prior Japanese Patent Application No. 2004-241065, filed on Aug. 20, 2004, the entire contents of which are incorporated herein by reference.

BACKGROUND OF THE INVENTION

1. Field of the Invention

The present invention relates to a touch panel device that determines a touch position of an object by detecting attenuation position of a surface acoustic wave due to a touch of the object. The touch panel device is used as an input device of a personal computer or a personal digital assistant, for example.

2. Description of the Prior Art

As an input device of a personal computer, a mobile computer, a personal digital assistant device (PDA) or the like, the touch panel device is often used in which information can be entered with the touch of a finger or a pen on a display screen of a display device.

There are two types of the touch panel devices. One utilizes a resistance film, and another utilizes a surface acoustic wave (SAW). The resistance film type has a multilayered resistance film in a touch area, which scatters light so that transmittance is low. A touch panel device of the surface acoustic wave type has transducers that are arranged at four sides of the touch area for emitting or receiving the surface acoustic wave. When a finger or the like touches the touch area, the touch position is detected in accordance with the attenuation position of surface acoustic wave. The surface acoustic wave type has an advantage of a high transmittance, a good visibility of the display screen and a high durability against a scratch because the touch area has no resistance film or the like.

The applicant proposed a structure of the surface acoustic wave type touch panel device in Japanese unexamined patent publication 2004-171213. This structure has a single phase transducer (SPT) of an electrode structure in which a piezoelectric thin film is sandwiched between a comb-like electrode and a plate electrode so that only one electrode is disposed on one surface. The structure also has a chevron type electrode structure in which dog-legged comb-like electrodes are arranged in a row.

The touch panel device includes a rectangular transparent substrate and total four transducers. Emitting transducers are disposed at the upper end portion and the lower end portion of the substrate while receiving transducers are disposed at the left end portion and the right end portion. The portion surrounded by the four transducers is the touch area. Each of the transducers has the SPT electrode structure described above and the chevron type electrode structure.

Each of the transducers has one end in the longitudinal direction where a wiring electrode and a connection portion between the comb-like electrode and the plate electrode are disposed closely to each other. An excitation voltage supplied via the wiring electrode is applied to the connection portion so that signal power supply is performed. In addition, a received signal is obtained from the connection portion to the wiring electrode so that signal fetch is performed. The other end of each of the wiring electrodes is drawn as a wire connection portion to one position of the substrate and is connected to a signal process circuit via a flexible cable or the like that is attached to the wire connection portion.

The excitation voltage is applied to the transducers disposed at the upper end and the lower end portions so as to generate surface acoustic waves. The generated surface acoustic wave propagates on the substrate in a diagonal direction and is received by the transducer disposed at the right or the left end portion. When a finger, a pen or the like touches a point in the touch area, the surface acoustic wave is attenuated at the touched point. Therefore, the touched position can be detected by a signal process in accordance with the position where a level of the received signal is attenuated.

In the above-mentioned touch panel device, it is desirable to enlarge the touch area TE and reduce an area for transducers as much as possible. Especially, a small type touch panel device that is used for a PDA or the like is required to have a narrow bezel in which transducers and wiring electrodes are embedded for realizing a compact size of the PDA or the like.

The above-mentioned SPT structure of transducer, in which only one electrode is disposed on each surface of a piezoelectric thin film, has an advantage for reducing its width which corresponds to a width of a bezel portion, to an opposed electrode structure in which two electrodes are disposed on one surface. Therefore, the former has an advantage for reducing a width of a bezel to the latter.

However, wiring electrodes for supplying power to transducers are arranged along the outer rims of the transducers, so the portion for the wiring electrodes should be made in a small width as much as possible. However, in order to reduce the width of the wiring electrode, it is necessary to increase a height of the wiring electrode so as to maintain a cross-sectional area thereof for preventing increase of resistance thereof. It is not good to increase a thickness of the touch panel device for increasing a height of the wiring electrode.

SUMMARY OF THE INVENTION

An object of the present invention is to provide a touch panel device and a method for manufacturing touch panel devices in which a width of a bezel portion of the touch panel device can be reduced as much as possible while preventing increase of a thickness of the touch panel device.

The touch panel device according to one aspect of the present invention includes a transparent substrate, a touch area disposed at the middle portion of the substrate and transducers disposed at the peripheral portion of the touch area for exciting or receiving surface acoustic waves. Each of the transducers includes a piezoelectric thin film, a plate electrode disposed at one surface of the piezoelectric thin film and a comb-like electrode disposed at the other surface of the piezoelectric thin film, the comb-like electrode consisting of a plurality of comb-like electrode fingers and a linear bus electrode to which one end of each of the plural comb-like electrode fingers is connected. A plurality of wiring electrodes is provided at the outer side of the transducer in parallel with the bus electrode of the transducer and is connected to the plate electrode and the bus electrode of any of the transducers. Each of the wiring electrodes includes an electrode base portion formed by printing silver paste containing fine particles on the surface of the substrate and an electrode main body formed by printing silver paste containing large particles and fine particles in a mixed manner on the electrode base portion.

Preferably, the plural comb-like electrode fingers and the bus electrode are arranged on the other surface of the piezoelectric thin film and are formed by printing silver paste containing fine particles in the same process as the electrode base portion.

More preferably, a girdle wall made of zinc oxide is formed between two of the plural wiring electrodes for preventing migration when the wiring electrode is printed.

In another embodiment, the bus electrode includes a bus electrode base portion formed by printing silver paste containing fine particles on the surface of the substrate and a bus electrode main body formed by printing silver paste containing large particles and fine particles in a mixed manner on the bus electrode base portion.

In this case, it is preferable that a girdle wall made of zinc oxide be formed between two of the plural wiring electrodes as well as between the wiring electrode and the bus electrode.

In addition, it is preferable that an acoustic absorption moisture proof layer be formed over the entire area of an edge portion of the substrate so as to cover the plural wiring electrodes and the bus electrode.

The plate electrode is disposed between the piezoelectric thin film and the substrate, a contact portion for connecting the plate electrode with the wiring electrode is a part of the plate electrode extending from and under the piezoelectric thin film onto the substrate, and the contact portion is covered with the acoustic absorption moisture proof layer.

A method for manufacturing a touch panel device according to the present invention includes the steps of forming the plate electrode on a surface of the substrate, forming the piezoelectric thin film on the plate electrode, forming the plural comb-like electrode fingers and the bus electrode on the surface of the piezoelectric thin film at the same time as forming an electrode base portion of a wiring electrode that is connected to the plate electrode and the bus electrode on the surface of the substrate by printing silver paste containing fine particles, and forming an electrode main body of the wiring electrode on the electrode base portion by printing silver paste containing large particles and fine particles in a mixed manner Another method for manufacturing a touch panel device includes the steps of forming the plate electrode on a surface of the substrate, forming the piezoelectric thin film on the plate electrode, forming the plural comb-like electrode fingers on the surface of the piezoelectric thin film at the same time as forming an electrode base portion of each of the bus electrode and a wiring electrode that is connected to the plate electrode and the bus electrode on the substrate by printing silver paste containing fine particles, and forming electrode main bodies of the bus electrode and the wiring electrode on each of the electrode base portions by printing silver paste containing large particles and fine particles in a mixed manner.

As necessary, the step for forming the piezoelectric thin film includes forming the piezoelectric thin film using zinc oxide and simultaneously forming a girdle wall using the zinc oxide between two of the plural wiring electrodes on the substrate so as to prevent migration when the wiring electrode is printed.

According to the present invention, a width of a bezel portion of the touch panel device can be reduced as much as possible, while increase of a thickness of the touch panel device is prevented.

According to another aspect of the present invention, migration when printing the wiring electrode can be prevented, so a space between the wiring electrodes can be reduced resulting in a smaller width of the bezel portion of the touch panel device.

According to another aspect of the present invention, invasion of moisture into a contact portion of the plate electrode with the wiring electrode can be prevented, so generation of corrosion due to a battery effect can be avoided.

DESCRIPTION OF THE PREFERRED EMBODIMENTS

Hereinafter, the present invention will be explained more in detail with reference to embodiments and drawings.

First Embodiment

Figure 1:
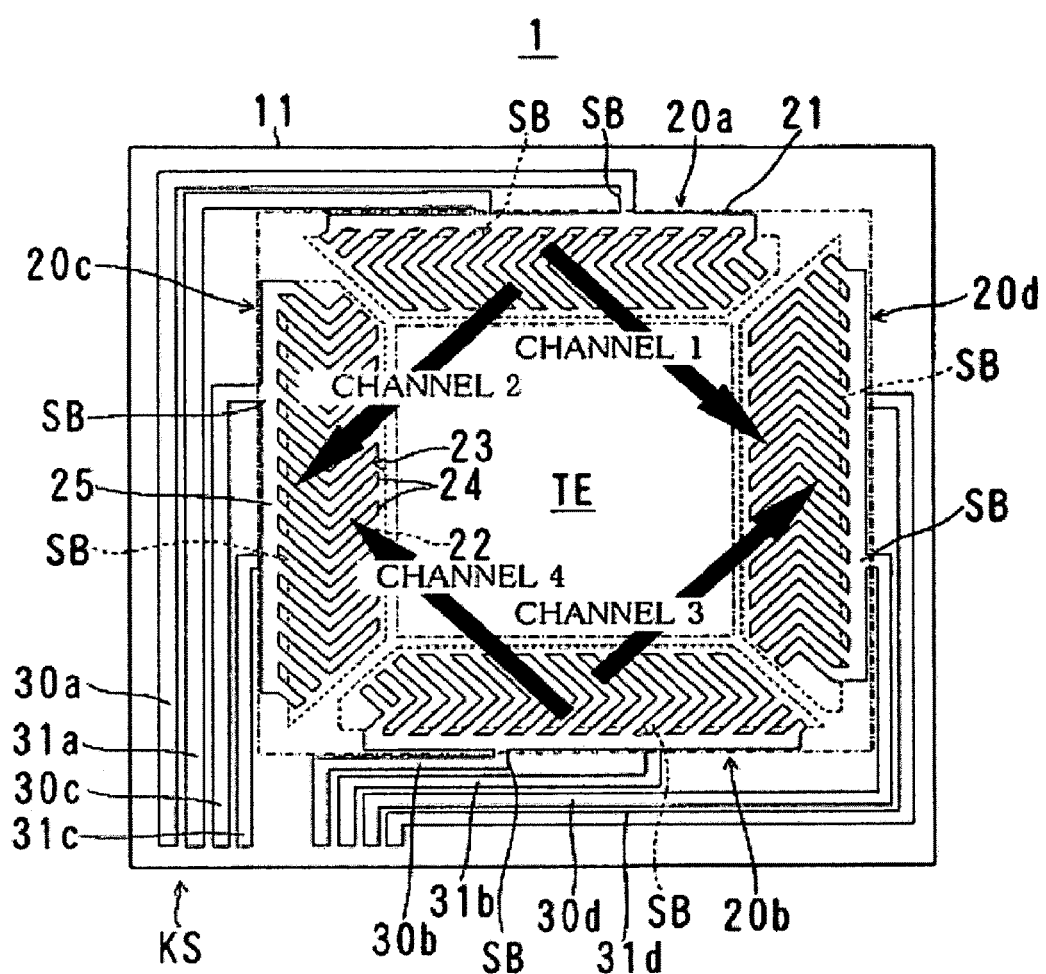
FIG. 1 is a plan view of a touch panel device according to a first embodiment of the present invention.
Figure 2:
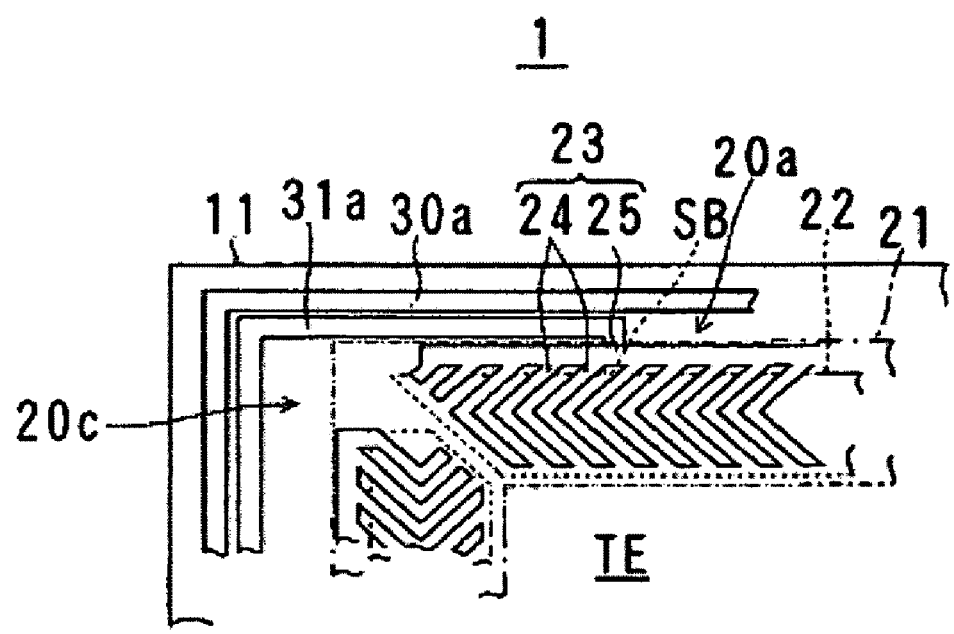
FIG. 2 is an enlarged view of a part of the touch panel device.
Figure 3:
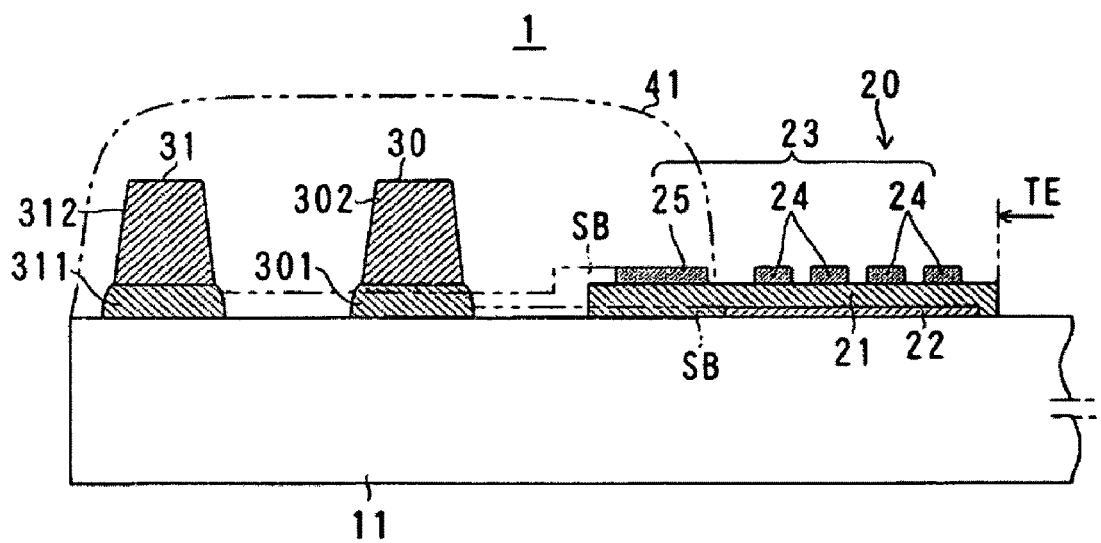
FIG. 3 is a cross sectional view of a portion of a transducer shown in an enlarged manner.
Figure 4:
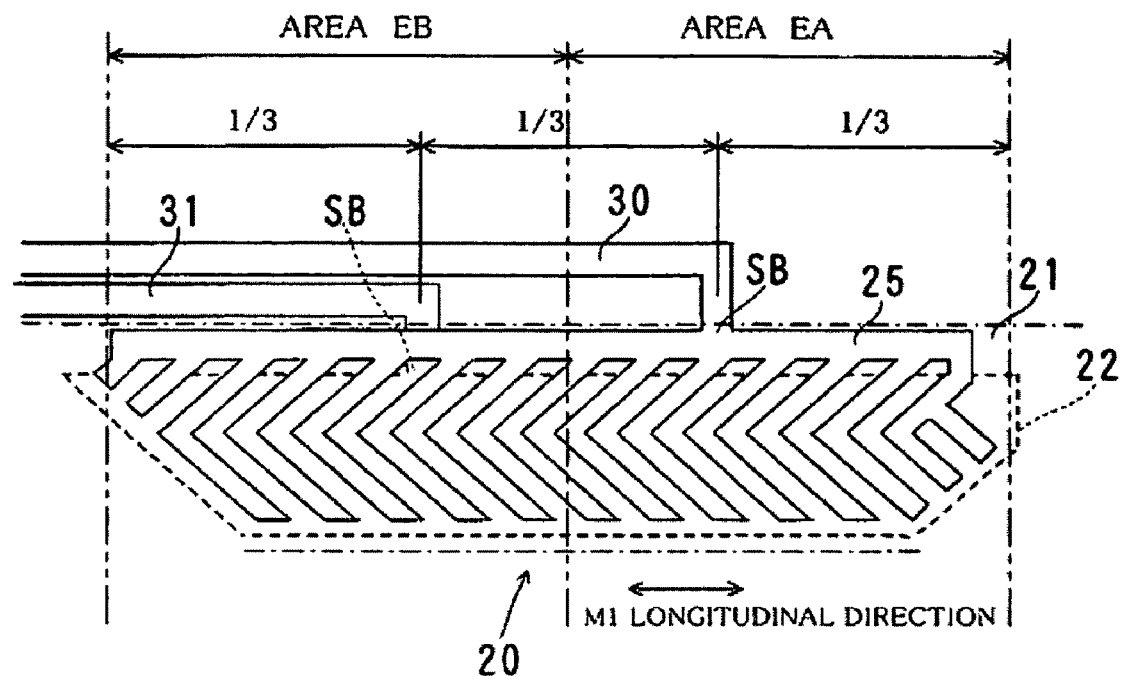
FIG. 4 shows a position of a connection portion.
Figure 5:
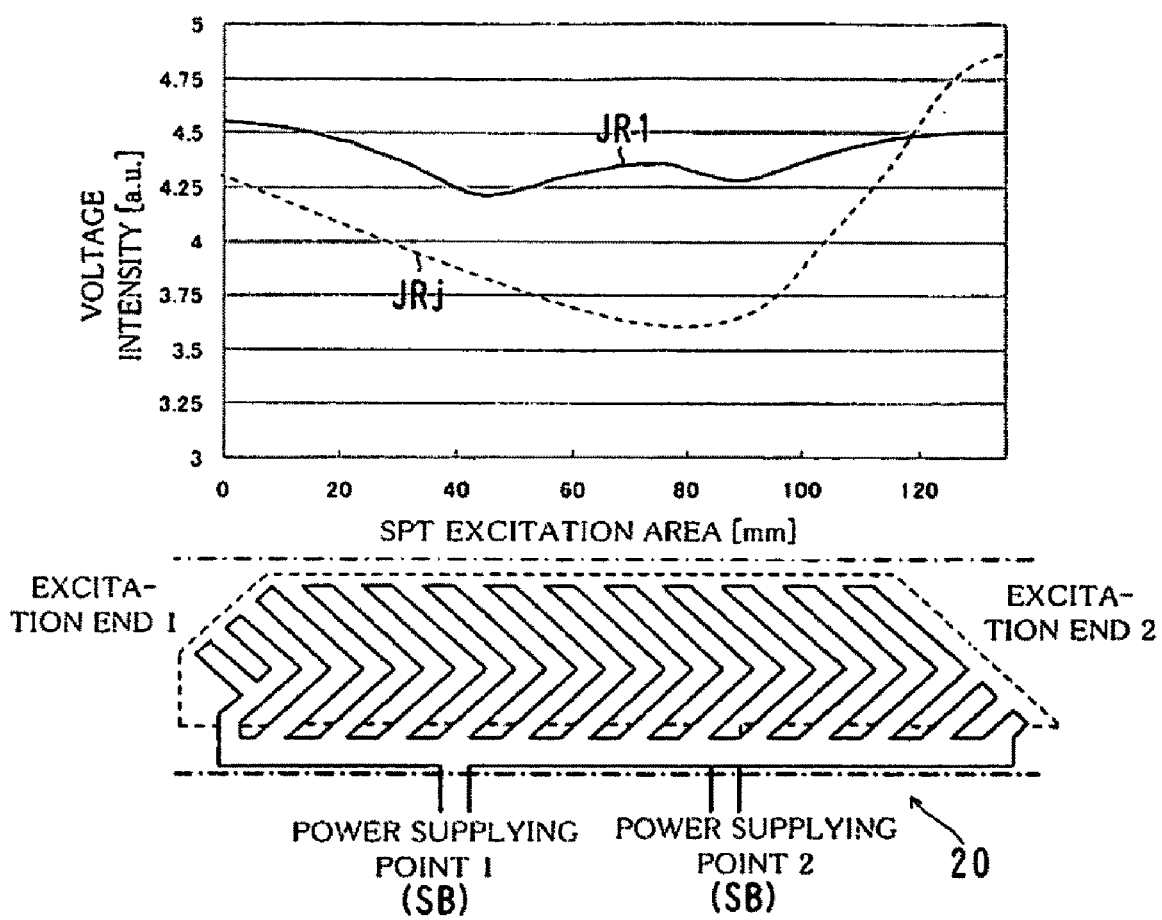
FIG. 5 shows an example of a voltage distribution of the transducer.
Figure 6:
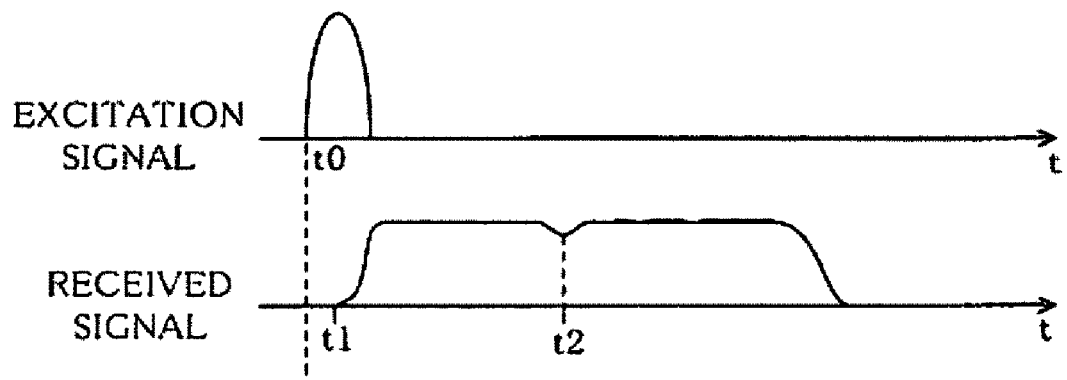
FIG. 6 shows waveforms of an excitation signal and a received signal.
Figure 7:
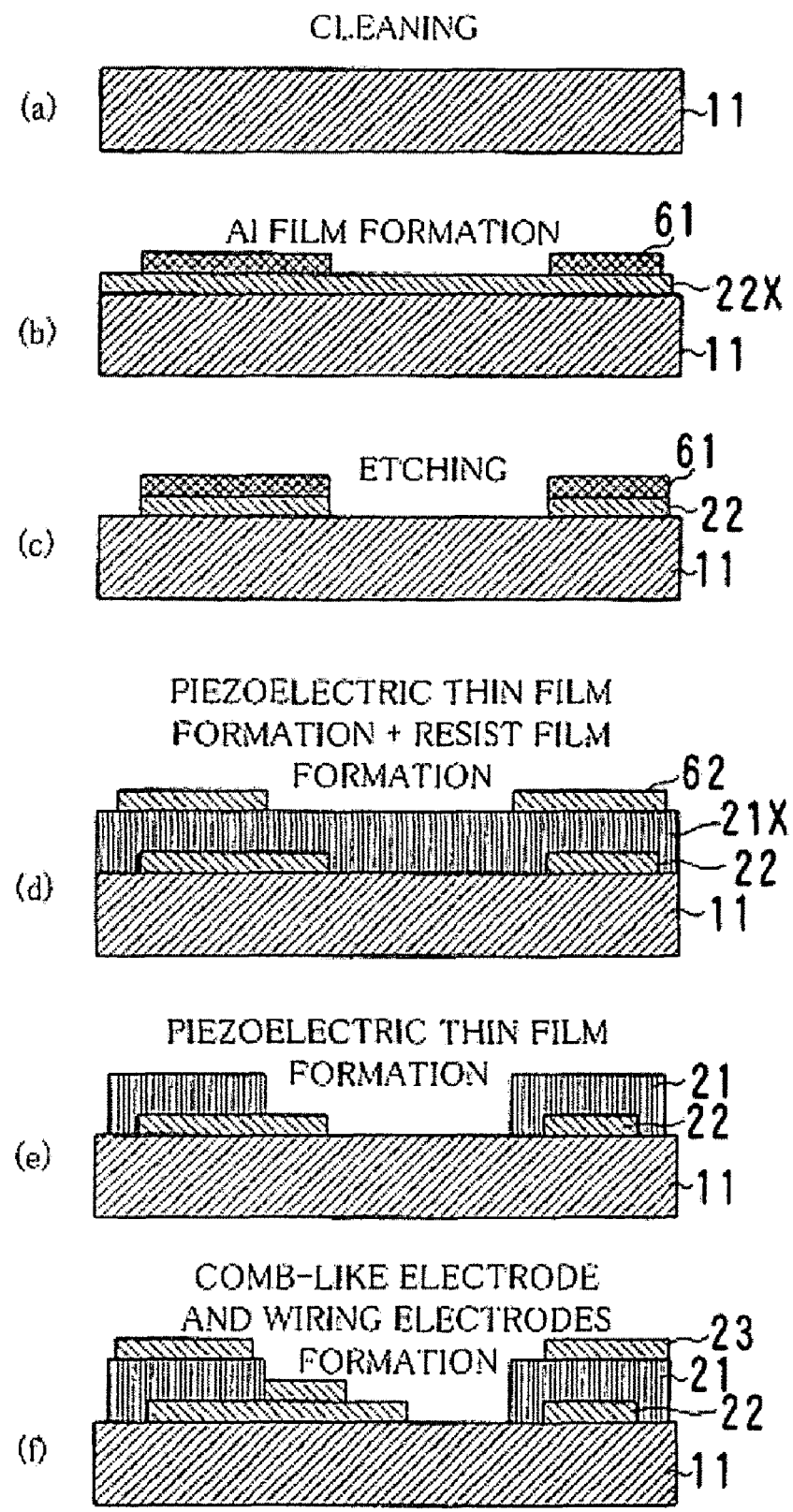
FIG. 7 is a diagram for explaining a general process for manufacturing the transducer.
Figure 8:
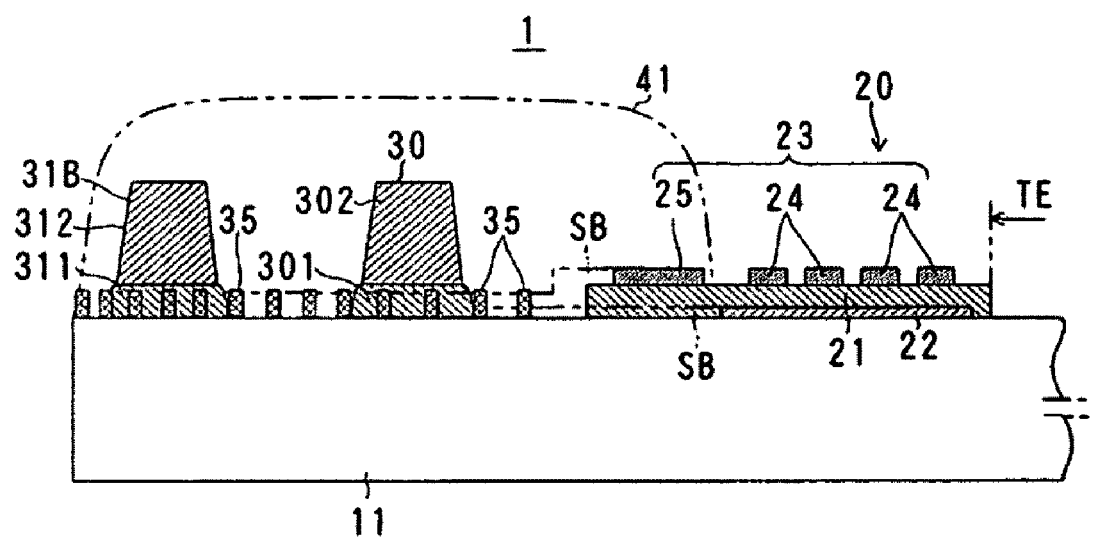
FIG. 8 is a cross section showing an example of providing an anchor at a base portion of the wiring electrode.

FIG. 1 is a plan view of a touch panel device 1 according to a first embodiment of the present invention, FIG. 2 is an enlarged view of a part of the touch panel device 1, FIG. 3 is a cross section of a portion of a transducer 20 and wiring electrodes 30 and 31 of the touch panel device 1 shown in an enlarged manner, FIG. 4 shows a position of a connection portion SB, FIG. 5 shows an example of a voltage distribution of the transducer 20, FIG. 6 shows waveforms of an excitation signal and a received signal, FIG. 7 is a diagram for explaining a general process for manufacturing the transducer 20, FIG. 8 is a cross section showing an example of providing an anchor 35 at a base portion of the wiring electrodes 30 and 31.

As shown in FIG. 1, the touch panel device 1 includes a rectangular transparent glass substrate 11, four transducers 20a-20d disposed at the periphery of the substrate 11, and wiring electrodes 30a-30d and 31a-31d disposed at the edge portion of the transducers 20a-20d. At the middle portion of the touch panel device 1, there is a touch area TE that is a rectangular portion surrounded by the transducers 20a-20d.

Two transducers 20a and 20b disposed at the upper and the lower side portions are used for excitation, while two transducers 20c and 20d disposed at the right and the left side portions are used for reception. An excitation voltage (or an excitation signal as shown in FIG. 6) is applied to the transducers 20a and 20b for excitation so as to generate surface acoustic waves, which propagate in the diagonal direction on the glass substrate 11 and are received by the transducers 20c and 20d for reception.

More specifically, the surface acoustic wave generated by the transducer 20a at the upper side portion propagates diagonally in the lower right direction (channel 1) and in the lower left direction (channel 2), which are received by the transducers 20c and 20d disposed at the right and the left side portions, respectively. The surface acoustic wave generated by the transducer 20b at the lower side portion propagates diagonally in the upper right direction (channel 3) and the upper left direction (channel 4), which are received by the transducers 20c and 20d disposed at the right and the left side portions, respectively. Note that the excitation voltage is applied to the transducers 20a and 20b for excitation at different timings.

The time necessary for propagation of a surface acoustic wave is proportional to the propagation distance, so the arrival time of the surface acoustic wave at the transducers 20c and 20d for reception is delayed more as farther from the transducers 20a and 20b for transmission. Therefore, the received signal in the transducers 20c and 20d for reception continues from the first arrival to the last arrival of the surface acoustic wave with a little attenuation so as to form a trapezoid signal (see FIG. 6). If a finger, a pen or the like touches one point in the touch area TE, the surface acoustic wave is attenuated at the touched portion. The touch position is detected in accordance with the position where the level of the received signal is attenuated.

The transducers 20a-20d have the same structure. Therefore, the structure of the transducer will be described only about one transducer 20a. In this description and in the attached drawings, a whole set of the transducers 20a-20d or a part thereof may be referred to as a "transducer 20".

Note that the transducer 20 and the wiring electrodes are drawn in a larger scale than the touch area TE in FIG. 1. Real dimensions are as follows, for example. A length of one side of the glass substrate 11 is a few centimeters to a few tens centimeters, a thickness of the same is a few tenth millimeters to a few millimeters, and a width of each transducer 20 is approximately a few millimeters. Namely, most of the surface of the glass substrate 11 is occupied by the touch area TE except for the peripheral small area. In addition, a scale in the vertical direction is larger than a scale in the horizontal direction in FIG. 3.

As shown well in FIGS. 2 and 3, the transducer 20a has a structure (the SPT structure) in which a piezoelectric thin film 21 is sandwiched between a plate electrode 22 and a comb-like electrode 23. The comb-like electrode 23 includes a plurality of comb-like electrode fingers 24, 24, 24 . . . each of which has a dog-legged shape in the plan view, a linear shaped bus electrode 25 that is connected to one end of each of the plural comb-like electrode fingers 24. Note that the plate electrode 22 is opposed to the comb-like electrode fingers 24 of the comb-like electrode 23 via the piezoelectric thin film 21.

The piezoelectric thin film 21 is made of zinc oxide (ZnO) and has a thickness of approximately 2 microns for example and a width of approximately a little more than 2 mm for example. The plate electrode 22 is made of aluminum, for example and has a thickness of approximately 0.4 microns for example and a width of approximately 2 mm for example. The comb-like electrode 23 is formed by printing nano silver paste (silver paste consisting of fine particles) and baking it, for example. The comb-like electrode finger 24 has a thickness of approximately 1.0-1.5 microns for example, a width of approximately 60 microns for example and a space of approximately 90 microns for example that means a pitch of approximately 150 microns for example. The bus electrode 25 has a thickness of approximately 2.5 microns for example and a width of approximately 150 microns for example.

Note that the dimensions of the piezoelectric thin film 21, the plate electrode 22 and the comb-like electrode 23 may be other values than the above-described values. For example, the width of the piezoelectric thin film 21 may be selected from the range of approximately 1-3 mm. The thickness of the plate electrode 22 may be selected from the range of approximately 0.3-0.4 microns, for example. The width of the plate electrode 22 may be selected from the range of approximately 1-2 mm, for example. The thickness of the comb-like electrode finger 24 may be selected from the range of approximately 1-2 microns, for example. The width of the comb-like electrode finger 24 may be selected from the range of approximately 50-75 microns, for example. The space between the comb-like electrode fingers 24 may be selected from the range of approximately 75-100 microns, for example. The thickness of the bus electrode 25 may be selected from the range of approximately 2-3 microns, for example. The width of the bus electrode 25 may be selected from the range of approximately 100-250 microns, for example.

The comb-like electrode 23 and the plate electrode 22 of each of the transducers 20a-20d are connected to the wiring electrodes 30a-30d and 31a-31d at the connection portion SB, respectively. Each of the wiring electrodes 30a-30d and 31a-31d is led along the outer rim of the transducer 20 on the glass substrate 11 and is drawn out at one portion of the glass substrate 11 located at the lower right portion in FIG. 1 as a wire connection portion KS. The wire connection portion KS is connected to a flexible cable or the like (not shown) so as to be connected to a signal process circuit. Note that a whole or a part of the wiring electrodes 30a-30d or 31a-31d may be referred to as a "wiring electrode 30" or a "wiring electrode 31", respectively.

In FIG. 3, the wiring electrodes 30 and 31 respectively include electrode base portions 301 and 311 formed on the glass substrate 11 by printing the nano silver paste and electrode main bodies 302 and 312 formed by printing hybrid nano silver paste (silver paste consisting of a mixture of large particles and fine particles) on the electrode base portion 311. The bus electrode 25 and the plate electrode 22 are connected to the electrode base portions 301 and 311 from each of the connection portions SB.

Each of the electrode base portions 301 and 311 has a thickness of approximately 2-3 microns for example and a width of approximately 200 microns for example. Each of the electrode main bodies 302 and 312 has a thickness of approximately 20 microns and a width of approximately 200 microns. A space between the wiring electrode 30 and the wiring electrode 31 is approximately 200 microns, and a space between the wiring electrode 30 and the bus electrode 25 (the piezoelectric thin film 21) is approximately 150 microns.

Note that the dimensions of the electrode base portions 301 and 311 and the spaces between them may be other values than the above-described values. For example, the widths of the electrode base portions 301 and 311 as well as the widths of the electrode main bodies 302 and 312 may be selected from a range of approximately 100-250 microns. The space between the wiring electrode 30 and the wiring electrode 31 may be selected from a range of approximately a few tens microns to 250 microns. The space between the wiring electrode 30 and the bus electrode 25 (the piezoelectric thin film 21) may be selected from a range of approximately a few tens microns to 150 microns.

Silver particles of very small grain sizes at approximately a few nanometers are used for the nano silver paste. Silver particles of very small grain sizes at approximately a few nanometers and silver particles of relatively large grain sizes at approximately 1-2 microns are mixed in the hybrid nano silver paste. It is possible to remove a binder component to reduce a resistivity. When using the nano silver paste, a resistivity thereof can be reduced to approximately one tenth of the conventional silver paste (in which silver particles of large grain sizes at approximately 1-2 microns are used), and a thin film having a thickness of approximately 1 microns can be formed. When using the hybrid nano silver paste, a resistivity thereof can be also reduced to approximately one tenth of the conventional silver paste. Both the nano silver paste and the hybrid nano silver paste can be applied by multiple printing so that a thick film can be formed. In this case, the hybrid nano silver paste can form a thick film readily by printing smaller number of times. For example, a thickness of approximately 20 microns described above can be formed by printing the hybrid nano silver paste once. Note that both the nano silver paste and the hybrid nano silver paste are available on the market and are known well.

The thick film of the electrode main body 302 or 312 reduces a total resistance of the wiring electrode 30 or 31. The electrode base portion 301 or 311 prevents a migration on the glass substrate 11 in the printing process and enables a good electrical and mechanical connection with the electrode main bodies 302 and 312. Consequently, the wiring electrodes 30 and 31 having sufficiently small resistances can be formed by small cross-sectional areas.

Therefore, a width of the area for the wiring electrodes 30 and 31 can be reduced and a height thereof can be reduced. As a result, a width of a bezel portion of the touch panel device 1 can be reduced while a thickness of the touch panel device 1 is prevented from increasing.

If the conventional silver paste is used for the entire wiring electrodes 30 and 31, thickness thereof should be approximately 200 microns that is ten times because of a high resistivity thereof. As a result, a thickness of the transducer 20 becomes large, and the number of times of printing will increase. Furthermore, there is a tendency of migration onto the glass substrate 11 during the printing process, so it is necessary to secure a sufficient space between the wiring electrodes 30 and 31 and a sufficient space between the wiring electrode 30 and the bus electrode 25, resulting in a large width of the bezel portion. Furthermore, efficiency of the excited surface acoustic wave is attenuated rapidly when a film thickness of the comb-like electrode 23 on the piezoelectric thin film 21 exceeds one hundredth of the wavelength (a pitch) λ of the surface acoustic wave in the transducer 20 having the SPT structure, so it is difficult to increase the efficiency when the conventional silver paste is used and a film thickness is large.

Note that capacitance of the comb-like electrode 23 is determined basically by a width and a length of the comb-like electrode finger 24 and a thickness of the piezoelectric thin film 21. Therefore, it is important to make the comb-like electrode finger 24 in a precise width. On the other hand, a thin film is necessary for a fine pattern of the comb-like electrode finger 24 for exciting the surface acoustic wave. It is possible to form the comb-like electrode finger 24 and the bus electrode 25 at the same time. However, as a width of the pattern is different between the comb-like electrode finger 24 and the bus electrode 25 by a few times, an optimal printing condition may be different between them. To avoid this situation, a pattern in which the comb-like electrode finger 24 and the bus electrode 25 are separated from each other may be used for a good yield.

In this embodiment, the connection portion SB between the wiring electrode 30 or 31 and the comb-like electrode 23 or the plate electrode 22 is disposed at the place described below. Namely, as shown well in FIG. 4, when dividing the transducer 20 into two areas EA and EB in the longitudinal direction M1 of the bus electrode 25, the connection portion SB of the bus electrode 25 with the wiring electrode 30 is provided in one area EA, and the connection portion SB of the plate electrode 22 with the wiring electrode 31 is provided in the other area EB.

Furthermore, in this embodiment, these two connection portions SB are located at the positions that divide the length of the transducer 20, i.e., the length of the area EA plus the length of the area EB into three equally.

The transducer 20 for excitation is supplied with a power of an excitation voltage from these two connection portions SB. Namely, connection portion SB is a power supplying point. A voltage distribution when the power is supplied to the transducer 20 is as follows.

In FIG. 5, the horizontal axis represents the length in the excitation area of the transducer 20 that is approximately 120 mm at most, the vertical axis represents a voltage intensity when the power is supplied from the two connection portions SB (the power supplying points 1 and 2), and the curved line JR1 represents the voltage distribution. According to this graph, the voltage intensity is the minimum at the power supplying points 1 and 2, and it increases along with distance from the power supplying points 1 and 2. However, there is no large variation as a whole, and the voltage distribution is substantially uniform over the entire excitation area.

Note that a curved line JRj in FIG. 5 shows an example of the voltage distribution in the case where the power is supplied from one end portion (an excitation end 1) as the conventional structure. It is understood from comparison between the curved line JR1 and the curved line JRj that the curved line JR1 has a smaller variation of the voltage intensity (variation of amplitude) and a more uniform voltage distribution than the curved line JRj.

Next, a general process for manufacturing the transducer 20 will be described with reference to FIG. 7.

First, as shown in Step (a) in FIG. 7, a glass substrate 11 is prepared, and a surface thereof is cleaned. Next, a thin film 22x of aluminum is formed on one surface of the glass substrate 11 by sputtering, vapor deposition or the like, and a resist film 61 is formed on the thin film 22x (Step (b) in FIG. 7). The thin film 22x is etched so as to form the plate electrode 22 (Step (c) in FIG. 7). The resist film 61 is removed, a thin film 21x of zinc oxide is formed, and a resist film 62 is formed on the thin film 21x (Step (d) in FIG. 7). The thin film 21x is etched so as to form the piezoelectric thin film 21 (Step (e) in FIG. 7). The resist film 62 is removed, and the comb-like electrode 23 and the wiring electrodes 30 and 31 are formed by printing and baking (Step (f) in FIG. 7).

Furthermore, as shown by a double-dashed line in FIG. 3, an acoustic absorption and moisture proof layer 41 is formed over the entire area at the edge portion of the glass substrate 11 so as to cover the wiring electrodes 30 and 31, the connection portion SB and the bus electrode 25. The acoustic absorption moisture proof layer 41 is formed not to overlap the excitation area of the comb-like electrode fingers 24. The acoustic absorption moisture proof layer 41 can be realized by forming a resin film having high acoustic absorption property on a moisture proof layer that is formed by vapor deposition of SiO2 or the like. Alternatively, it can be realized by applying an organic insulation film made of a moisture proof resin that is also an acoustic absorption material. For example, an acrylic resin, an epoxy resin or the like having a low water permeability and a high insulating properties can be used. When using a photosensitive or an ultraviolet curing resin, it is easy to form a film only in a desired area.

A thickness of the acoustic absorption moisture proof layer 41 is required to be approximately one fourth of wavelength of the surface acoustic wave or larger. If the acoustic absorption moisture proof layer 41 is thin, the surface acoustic wave may be reflected by the end face of the glass substrate 11, thereby a signal-to-noise ratio may be deteriorated. For example, if the wavelength λ is 150 microns, a thickness of the acoustic absorption moisture proof layer 41 is set to approximately 40 microns, for example. The acoustic absorption moisture proof layer 41 is printed and formed to cover the entire area from an area that does not prevent excitation to the end face of the glass substrate 11 so as to prevent water from entering the electrode portion.

In addition, it is desirable to structure so that a finger or the like cannot touch directly to the portion of the transducer 20. However, there is possibility that water containing acid or alkali such as a screen cleaner or sweat may enter the touch panel device. Considering such cases, a protection film is provided on the surface and the end faces of the comb-like electrode 23 and the piezoelectric thin film 21. For example, an organic thin film is made of a material having chemical resistance in a thin film, e.g., a fluorocarbon resin such as a cytop (registered trademark) or a benzocyclobutene (BCB) resin having an aromatic structure. Particularly, there is a BCB resin that has photosensitive property, which can be readily used for forming a thin film only in a desired area and patterned.

In this way, after forming the acoustic absorption moisture proof layer 41 to cover the area of the wiring electrodes 30 and 31 and the bus electrode 25, the protection film is formed in the area including the comb-like electrode fingers 24 and the piezoelectric thin film 21. Then, water repellent and lipophobic coating is processed on the surface of the touch area TE of the glass substrate 11. Thus, reliability of the touch panel device 1 is improved.

In the embodiment described above, in order to decrease the space between the wiring electrodes 30 and 31 as well as the space between the wiring electrode 31 and the bus electrode 25, a girdle (a wall) can be provided that has an insulating property for separating them. Such a girdle is made of zinc oxide for example, and it is preferable to form the girdle when forming the piezoelectric thin film 21, simultaneously by patterning.

In addition, for stronger mechanical bonding of the wiring electrodes 30 and 31 with the glass substrate 11, it is preferable to provide a plurality of anchors 35, 35, 35 . . . made of a material having a good adhesiveness on the surface of the glass substrate 11 as shown in FIG. 8. As the anchors 35 form many grooves, the electrode base portions 301, 311 fit in the grooves so that mechanical cohesive strength with the glass substrate 11 is increased. In this case, the anchor 35 also works as the girdle for separating the wiring electrode 30 from the wiring electrode 31. The anchor 35 is made of zinc oxide for example, and it is preferable to form the anchor 35 when forming the piezoelectric thin film 21, simultaneously by patterning.

Thus, by providing the girdle or the anchor 35, the space between the wiring electrodes 30 and 31 as well as the space between the wiring electrode 31 and the bus electrode 25 can be reduced so that a width of the bezel portion of the touch panel device 1 can be reduced more.

Second Embodiment

Here, only differences between the first and the second embodiments will be described.

Figure 9:
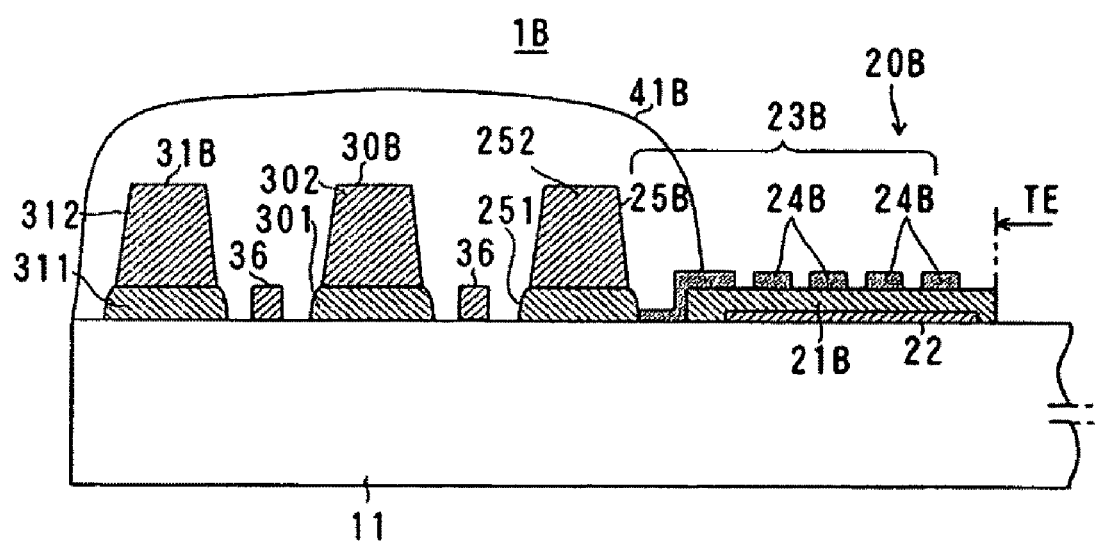
FIG. 9 is a cross section of a portion of the transducer of the touch panel device according to a second embodiment of the present invention shown in an enlarged manner.
Figure 10:
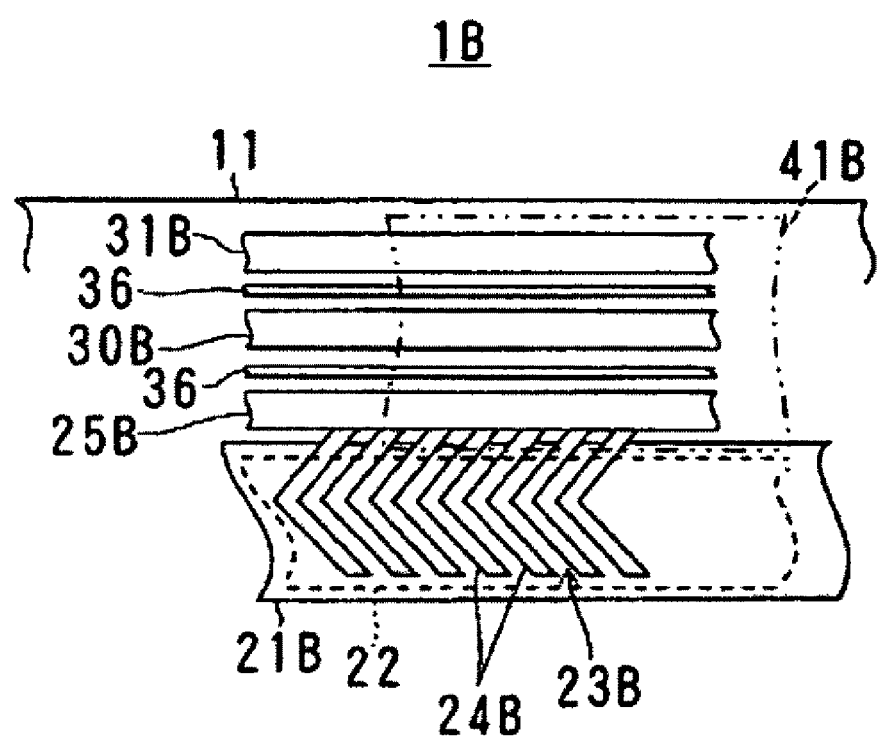
FIG. 10 is a plan view corresponding to FIG. 9.

FIG. 9 is a cross section of a portion of transducer 20B and wiring electrodes 30B and 31B of the touch panel device 1B according to a second embodiment of the present invention shown in an enlarged manner, and FIG. 10 is a plan view corresponding to FIG. 9.

As shown in FIGS. 9 and 10, the bus electrode 25B is formed not on the surface of the piezoelectric thin film 21B but on the surface of the glass substrate 11. Namely, the bus electrode 25B includes an electrode base portion 251 that is formed on the surface of the glass substrate 11 by printing nano silver paste and an electrode main body 252 that is formed on the electrode base portion 251 by printing hybrid nano silver paste. The electrode base portion 251 has a thickness of approximately 2-3 microns for example and a width of approximately 100-150 microns for example. The electrode main body 252 has a thickness of approximately 20 microns for example and a width of approximately 100-150 microns for example. Thus, a resistance of the bus electrode 25B can be sufficiently reduced while a thickness thereof can be sufficiently reduced.

Structures and dimensions of the wiring electrodes 30B and 31B are substantially the same as the wiring electrodes 30 and 31 of the first embodiment. A space between the wiring electrode 30B and the wiring electrode 31B is approximately 30-200 microns, and a space between the wiring electrode 31B and the bus electrode 25B is approximately 30-150 microns. Girdles 36 and 36 are provided between the wiring electrodes 30B and 31B as well as between the wiring electrode 31B and the bus electrode 25B. The girdle 36 is made of zinc oxide at the same time as formation of the piezoelectric thin film 21B. Note that the comb-like electrode finger 24B is formed so as to extend from the surface of the piezoelectric thin film 21B to the bus electrode 25B by printing the nano silver paste. The acoustic absorption moisture proof layer 41B is formed over the entire area of the edge portion of the glass substrate 11 so as to cover the wiring electrodes 30B and 31B and the bus electrode 25B.

The girdle 36 prevents a migration of the wiring electrodes 30B and 31B and the bus electrode 25B when they are printed, so that spaces among them can be reduced. Instead of the girdle 36, an anchor 35 may be used as shown in FIG. 8. In addition, the girdle 36 may be omitted.

A width of the bezel portion can be reduced also in the touch panel device 1B of the second embodiment.

Third Embodiment

Here, only differences between the first and the third embodiments will be described.

Figure 11:
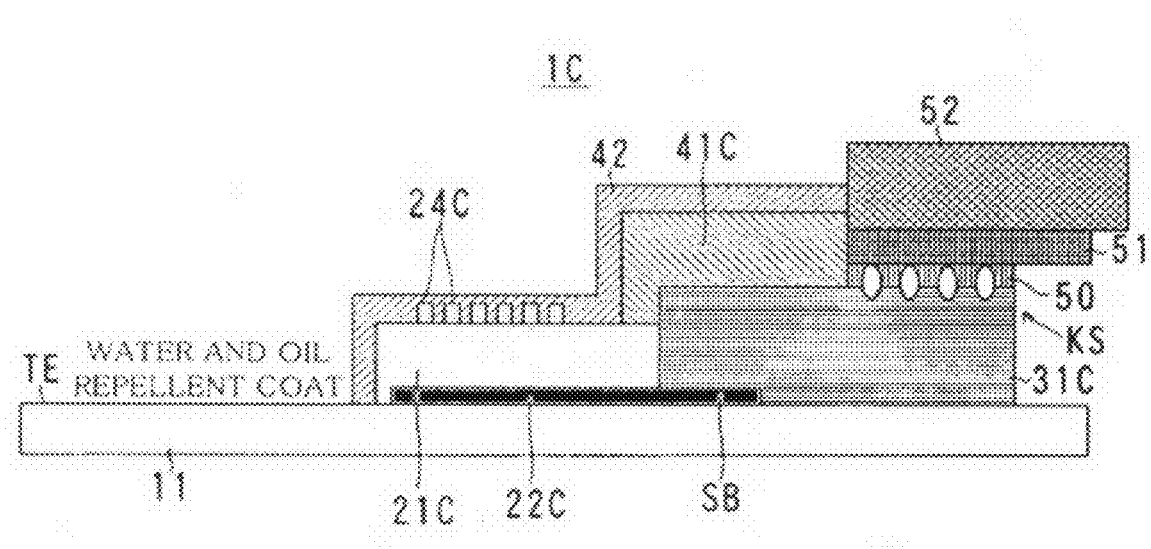
FIG. 11 is a cross sectional view of a portion of the transducer of the touch panel device according to a third embodiment of the present invention shown in an enlarged manner.

FIG. 11 is a cross section of a portion of the transducer 20C and wiring electrodes 30C and 31C of the touch panel device 1C according to the third embodiment of the present invention. FIG. 11 shows a cross section cut by a plane including a connection portion SB of a plate electrode 22C with a wiring electrode 31C.

As shown in FIG. 11, the plate electrode 22C, a piezoelectric thin film 21C and a comb-like electrode 23C are formed on the surface of the glass substrate 11. The plate electrode 22C is a thin film of aluminum having a thickness of approximately 0.3 microns for example and is provided so as to extend a little from and under the piezoelectric thin film 21C. The piezoelectric thin film 21C is a thin film of zinc oxide having a thickness of approximately 2 microns, for example. The comb-like electrode finger 24C is a thin film made of nano silver paste having a thickness of approximately 1-1.5 microns, for example.

The plate electrode 22C is connected to the wiring electrode 31C at the connection portion SB. Here, the connection portion SB is only a part of the plate electrode 22C extending from and under the piezoelectric thin film 21C. A contact portion of the plate electrode 22C made of aluminum with the wiring electrode 31C made of silver can generate a potential difference due to a battery effect when moisture invades, and current by the potential difference may cause corrosion. Therefore, to prevent moisture from invading the contact portion, an acoustic absorption moisture proof layer 41C made of a member that interrupts moisture is formed on the contact portion. Namely, the acoustic absorption moisture proof layer 41C covers the contact portion of the plate electrode 22C with the wiring electrode 31C. Thus, invasion of moisture into the contact portion of the plate electrode 22C with the silver wiring electrode 31C is prevented, so that generation of corrosion due to the battery effect can be avoided. A material of the acoustic absorption moisture proof layer 41C and a method of forming the same are the same as the acoustic absorption moisture proof layer 41 described above.

The wiring electrode 31C is led on the glass substrate 11, and the end portion thereof that is a wire connection portion KS is connected to a flexible cable (a flexible pad) 52 having an electrode 51 made of a copper alloy via an adhesive (ACF) 50 containing fine particles of gold.

In this way, the third embodiment provides a structure in which the plate electrode 22C includes a part that extends from and under the piezoelectric thin film 21C, which is connected to the wiring electrode 31C. Therefore, the portion that can generates corrosion is limited, a portion to be moisture proof or waterproof is a vary narrow area, and the acoustic absorption moisture proof layer 41C can provide substantially complete moisture proof effect.

It is possible to extend the plate electrode 22C that is a ground electrode to the wire connection portion KS as it is, and to form the wiring electrode 31C on the extended plate electrode 22C. In this case, however, the contact portion of aluminum with silver becomes long, so that the moisture proof effect by the acoustic absorption moisture proof layer is lowered and it is difficult to prevent corrosion for a long period.

Note that a middle portion of the wiring electrode 31C in the longitudinal direction is omitted in FIG. 11. In addition, though not shown in FIG. 11, the connection portion SB of the bus electrode with the wiring electrode and the wire connection portion KS at the end portion of the wiring electrode have the same structure as the case of the wiring electrode 31C described above, resulting in the same effect.

In addition, a protection film 42 is provided over the entire area of surfaces and end faces of the piezoelectric thin film 21C, the comb-like electrode finger 24C and the acoustic absorption moisture proof layer 41C. The protection film 42 is made of a BCB resin or the like as described above. The protection film 42 has a thickness of approximately 1 micron, for example. The surface of the touch area TE is covered with a water repellent and lipophobic coat. Thus, the touch panel device 1C having high reliability can be obtained.

In each of the embodiments described above, an electrical length from the connection portion SB to the wire connection portion KS in each of the transducers 20a-20d is not considered specially. However, it is possible to make the electrical lengths to be equal to each other by arranging the wiring electrodes 30a-30d and 31a-30d and the wire connection portion KS.

In each of the embodiments described above, the structures, the shapes, the quantities, the materials and the method of formation or the like of the entire or a part of the transducer 20, the wiring electrodes 30 and 31 and the touch panel devices 1, 1B and 1C can be modified if necessary in accordance with the spirit of the present invention.

The present invention can be used as an input device for a personal computer, mobile computer, a PDA or the like.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A method for manufacturing a touch panel device including a transparent substrate, a touch area disposed at the middle portion of the substrate and transducers disposed at the peripheral portion of the touch area, each of the transducers consisting of a piezoelectric thin film, a plate electrode disposed at one surface of the piezoelectric thin film and a comb-like electrode disposed at the other surface of the piezoelectric thin film, the comb-like electrode having a plurality of comb-like electrode fingers and a linear bus electrode to which one end of each of the plural comb-like electrode fingers is connected, the method comprising the steps of:
    forming the plate electrode on a surface of the substrate;
    forming the piezoelectric thin film on the plate electrode;
    forming the plural comb-like electrode fingers and the bus electrode on the surface of the piezoelectric thin film at the same time as forming an electrode base portion of a wiring electrode that is connected to the plate electrode and the bus electrode on the surface of the substrate by printing silver paste containing fine particles; and
    forming an electrode main body of the wiring electrode on the electrode base portion by printing silver paste containing large particles and fine particles in a mixed manner.

2. The method according to claim 1, wherein the step for forming the piezoelectric thin film includes forming the piezoelectric thin film using zinc oxide and simultaneously forming a girdle wall using the zinc oxide between two of the plural wiring electrodes on the substrate so as to prevent migration when the wiring electrode is printed.

3. A method for manufacturing a touch panel device including a transparent substrate, a touch area disposed at the middle portion of the substrate and transducers disposed at the peripheral portion of the touch area, each of the transducers consisting of a piezoelectric thin film, a plate electrode disposed at one surface of the piezoelectric thin film and a comb-like electrode disposed at the other surface of the piezoelectric thin film, the comb-like electrode having a plurality of comb-like electrode fingers and a linear bus electrode to which one end of each of the plural comb-like electrode fingers is connected, the method comprising the steps of:
    forming the plate electrode on a surface of the substrate;
    forming the piezoelectric thin film on the plate electrode;
    forming the plural comb-like electrode fingers on the surface of the piezoelectric thin film at the same time as forming an electrode base portion of each of the bus electrode and a wiring electrode that is connected to the plate electrode and the bus electrode on the substrate by printing silver paste containing fine particles; and
    forming electrode main bodies of the bus electrode and the wiring electrode on each of the electrode base portions by printing silver paste containing large particles and fine particles in a mixed manner.

4. The method according to claim 3, wherein the step for forming the piezoelectric thin film includes forming the piezoelectric thin film using zinc oxide and simultaneously forming a girdle wall using the zinc oxide between two of the plural wiring electrodes on the substrate so as to prevent migration when the wiring electrode is printed.

* * * * *